United States Patent [19]

Okudaira

[11] Patent Number: 4,491,395

[45] Date of Patent: Jan. 1, 1985

[54] ZOOM LENS SYSTEM

[75] Inventor: Sadao Okudaira, Tokyo, Japan

[73] Assignee: Asahi Kogaku Kogyo Kabushiki Kaisha, Tokyo, Japan

[21] Appl. No.: 349,345

[22] Filed: Feb. 16, 1982

[30] Foreign Application Priority Data

Feb. 16, 1981 [JP] Japan .................................. 56-21183

[51] Int. Cl.³ .............................................. G02B 15/16
[52] U.S. Cl. ................................................... 350/427
[58] Field of Search .............................. 350/423, 427

[56] References Cited

U.S. PATENT DOCUMENTS 4,050,788 9/1977 Wendisch ............................ 350/427

FOREIGN PATENT DOCUMENTS 55-45077 3/1980 Japan ................................... 350/427
55-95922 7/1980 Japan ................................... 350/427

*Primary Examiner*—John K. Corbin
*Assistant Examiner*—Scott J. Sugarman
*Attorney, Agent, or Firm*—Sughrue, Mion, Zinn, Macpeak, and Seas

[57] ABSTRACT

A zoom lens system having, in order from the object side, a first lens group with a positive focal length, a second lens group with a negative focal length, a third lens component with a negative focal length and a fourth lens group with a positive focal length. The second lens group and third lens component are moved along the optical axis to achieve variation in the overall focal length and correction for focus movement. The first lens group includes one negative lens and at least two positive lenses, the second lens group includes, in order from the object side, a negative lens, a negative lens and a positive lens, the third lens component includes at least one negative lens, and the fourth lens group includes an optical path separation prism, and, in order from the object side, at least three positive lenses, at least two negative lenses and at least two positive lenses.

4 Claims, 8 Drawing Figures

ZOOM LENS SYSTEM

BACKGROUND OF THE INVENTION

Recently, lenses for small cameras such as lenses for 8-mm movie cameras and lenses for home VTR cameras have been rapidly developed. Since these optical systems are small in picture size and of movie type, most of them employ zoom lenses. As films and image pickup tubes have been improved in sensitivity, the use of zoom lens having large apertures makes it popular to take pictures in relatively dark places. In order to increase the photographing range, there has been a strong demand for the provision of a zoom lens which is high in zoom ratio, wide in photographing angle and compact.

SUMMARY OF THE INVENTION

This invention relates to a zoom lens system which satisfies these requirements and is designed to be applicable to a single tube type color video camera; i.e., a compact and high performance optical system which is large in aperture and high in zoom ratio and includes a wide angle and has a sufficiently long exit pupil.

DESCRIPTION OF THE PREFERRED EMBODIMENTS

Figure 1:
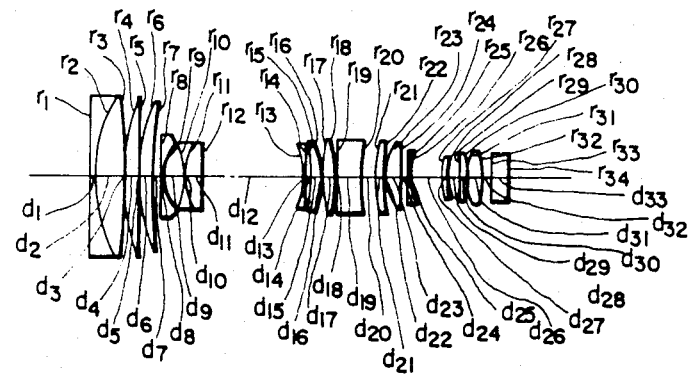
FIG. 1 is a sectional view showing a first example of a zoom lens system according to this invention.
Figure 2:
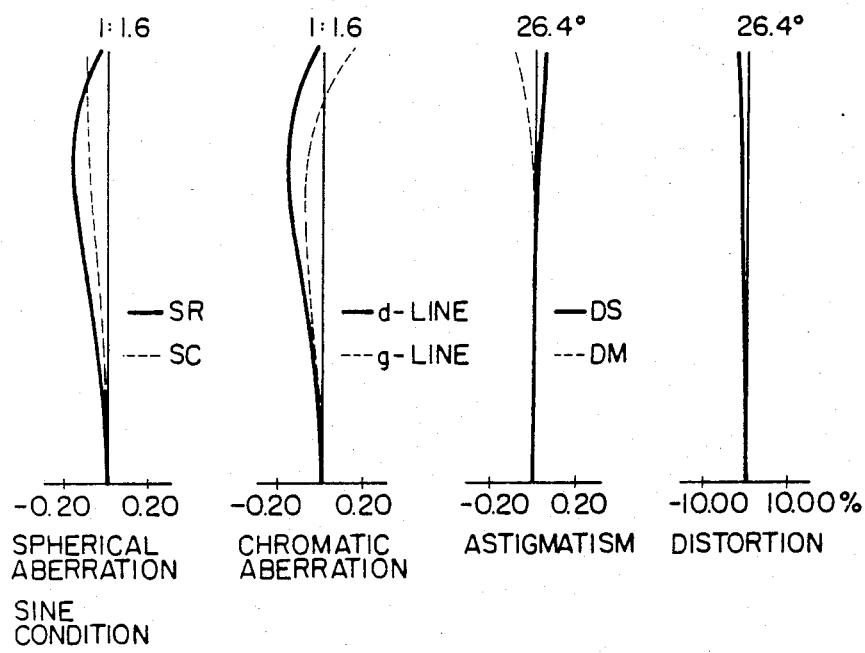
FIGS. 2, 3 and 4 are graphical representations showing aberration curves at the minimum, intermediate and maximum focal lengths of the lens system in FIG. 1, respectively.
Figure 3:
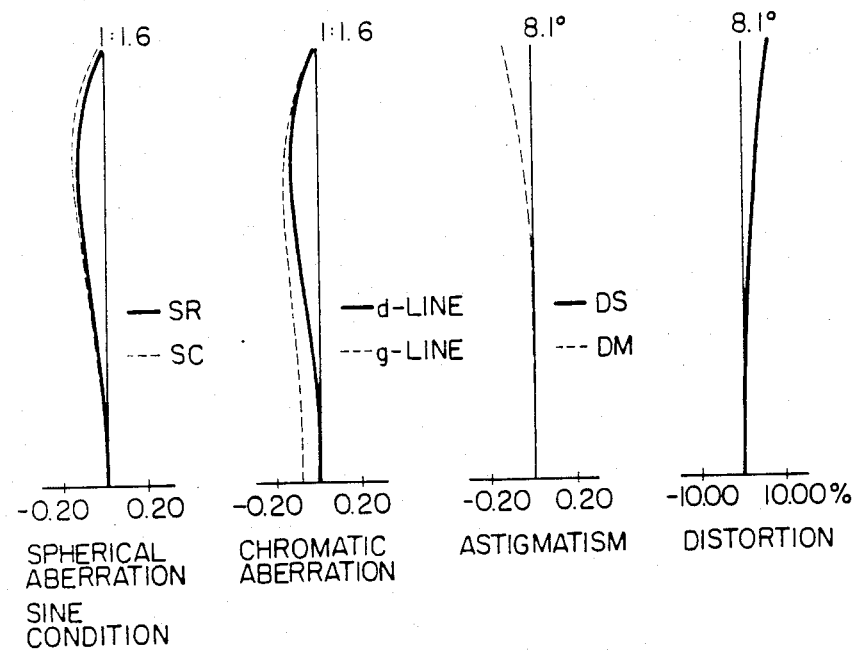
Figure 4:
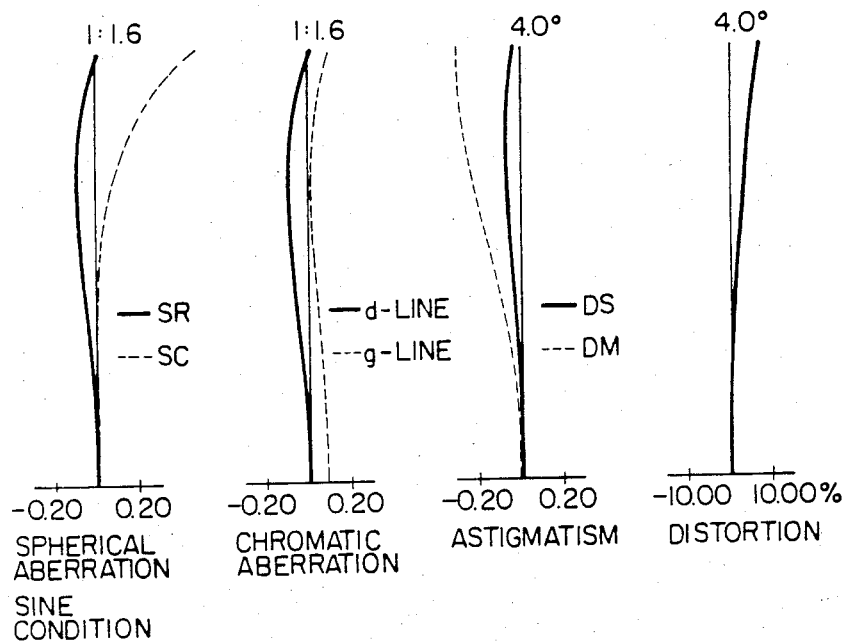
Figure 5:
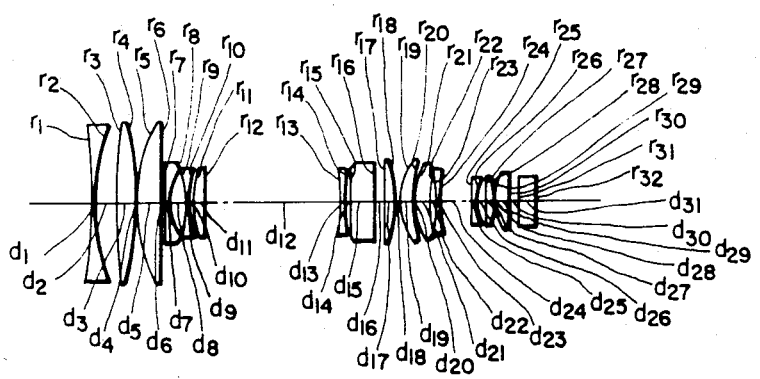
FIG. 5 is a sectional view showing a second example of the zoom lens system of the invention.
Figure 6:
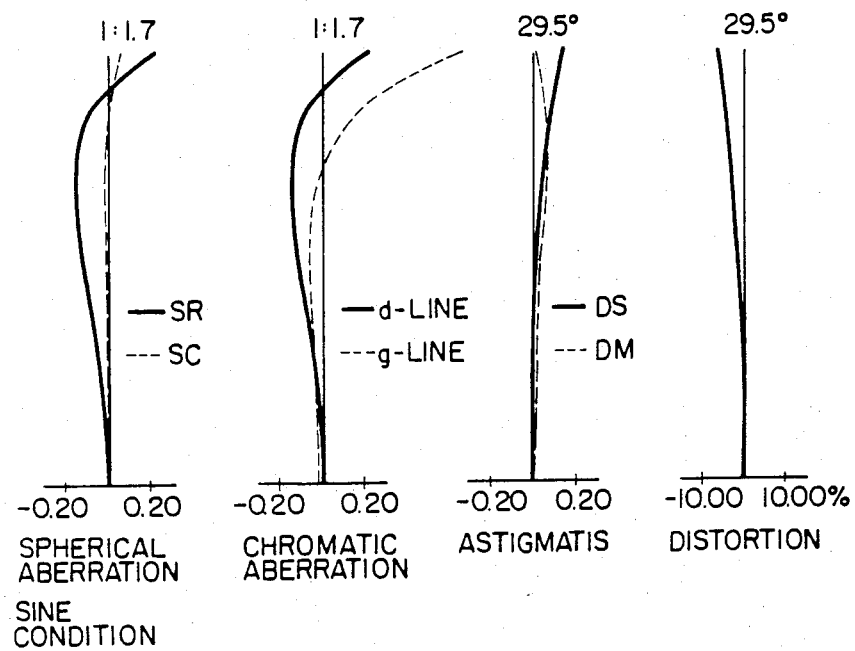
FIGS. 6, 7 and 8 are graphical representations showing aberration curves at the minimum, intermediate and maximum focal lengths of the lens system in FIG. 5.
Figure 7:
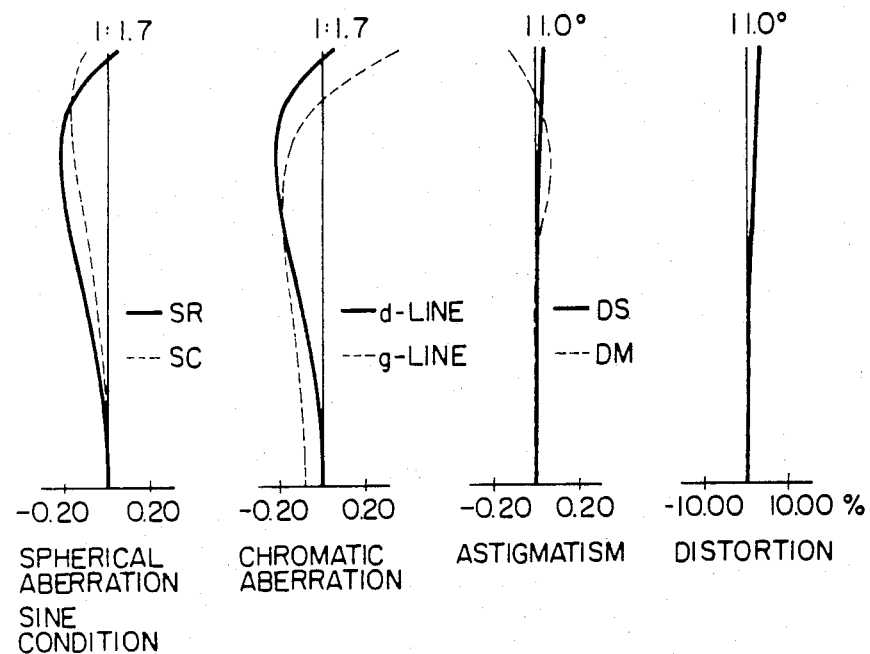
Figure 8:
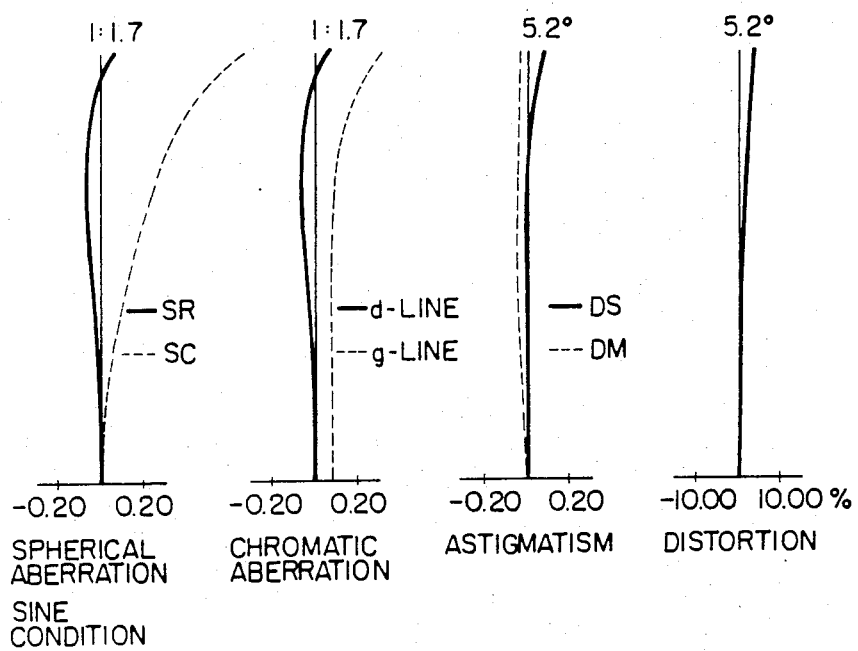

The invention provides a zoom lens system comprising, in order from the object side, a first lens group having a positive focal length, a second lens group having a negative focal length, a third lens component having a negative focal length and a fourth lens group having positive focal length. The term component as used herein may refer to one or more lenses. The second lens group and third lens component are moved in the direction of the optical axis to achieve variation in the overall focal length and correction for focus movement. The first lens group comprises one negative lens and at least two positive lenses, the second lens group comprises, in order from the object side, a negative lens, a negative lens and a positive lens, the third lens component comprises at least one negative lens, and the fourth lens group comprises an optical path separation prism and, in order from the object side, at least three positive lenses, at least two negative lenses and at least two positive lenses. The zoom lens system is excellent in performance and satisfies the following conditions:

$$4.6 F_S < f_1 < 6.5 F_S \quad (1)$$

$$F_S < |f_2| < 2 F_S, \; f_2 < 0 \quad (2)$$

$$l > 1.4 F_S \quad (3)$$

$$\bar{n}_2 > 1.70 \quad (4)$$

$$\bar{\nu}_1 > 45 \quad (5)$$

where
- $F_S$ is the overall focal length at the minimum focal length,
- $f_1$ is the resultant focal length of the first lens group,
- $f_2$ is the resultant focal length of the second lens group,
- $l$ is the distance between the apex of the final lens surface of the positive lens, disposed on the object side, of the fourth lens group and the apex of the front lens surface of the positive lens, disposed on the image side, of the fourth lens group,
- $\bar{n}_2$ is the average refractive index of the negative lenses in the second lens group, and
- $\bar{\nu}_1$ is the average Abbe number of the positive lenses in the first lens group.

Condition (1)

This condition concerns the resultant focal length of the first lens group in the zoom lens system, which is moved in the direction of the optical axis with variation of distance to the object, to thereby control focusing. If the upper limit $6.5 F_S$ is exceeded, generation of aberration is suppressed in the first lens group. However, in this case, in focusing on an object located near the lens system, the front lens diameter must be increased in order to obtain a sufficient amount of light for the marginal portion of the image plane. Inversely, if the focal length $f_1$ is smaller than $4.6 F_S$, with a zoom ratio zoom lens including a wide angle similar to that of the zoom lens system of the invention, it is difficult to compensate for various aberrations, especially coma aberration and astigmatism at the minimum focal length and spherical aberration at the maximum focal length.

Condition (2)

Condition (2) concerns the resultant focal length of the second lens group, which mainly controls the variation of focal length in the zoom lens system. When $|f_2|$ is greater than $2 F_S$, then the various aberration compensations can be carried out effectively. However, in order to obtain a zoom ratio and a wide angle which are of the order of those of the zoom lens system, the amount of movement of the second lens group is unavoidably increased with the variation in focal length, and the overall length and the front lens diameter must be increased. On the other hand, when $|f_2|$ is set smaller than $F_S$, the lens system can be effectively made compact. However, if the second lens group is formed with a number of lenses which is substantially equal to that in the zoom lens system and by using relatively stable optical material which is available, then the radius of curvature of each lens must be strictly limited and accordingly the coma aberration and astigmatism at the minimum focal distance become worse. Increasing the number of lenses in the second lens group increases the manufacturing cost and makes the lens system bulky.

Condition (3)

This condition satisfies an exit pupil condition which makes it possible to apply the lens system to a single tube type color video camera which uses a stripe filter or the like. In a camera using a stripe filter, it is essential to set the position of the exit pupil sufficiently apart from the image plane; otherwise the chromatic balance of the entire image cannot be obtained because of the stripe filter directivity. The exit pupil can be sufficiently spaced from the image plane by making l much larger than 1.4 $F_S$ as defined by condition (3).

Condition (4)

Condition (4) is provided in association with condition (3). In the case where the zoom lens system of the invention is made compact by forming the second lens group with about three lenses, it is essential that the average index $\overline{n}_2$ of the negative lenses in the second group is larger than 1.70. If this condition is not satisfied, in a compact and high zoom ratio zoom lens system it is considerably difficult to correct the variation of distortion at the wide angle focal length end and the telephoto end.

Condition (5)

Condition (5) is important in suppressing the variation of chromatic aberration which occurs with zooming. If the average dispersion value of the Abbe number of the positive lenses in the first lens group is smaller than 45, in a zoom lens whose magnification is as high as that of the zoom lens system of the invention it is considerably difficult to obtain the chromatic aberration balance at the wide angle focal length end and the telephoto end.

Data employed in examples of the zoom lens system according to the invention are as follows: In the examples $R_i$ is the radius of curvature of the i-th lens surface,
$D_i$ is the lens thickness or distance of the i-th lens,
$N_i$ is the refractive index at d-line of the i-th lens,
$\nu_i$ is the Abbe number of the i-th lens,
f is the focal length,
$l_1$ is the distance between first and second lens groups,
$l_2$ is the distance between second lens group and third lens component, and
$l_3$ is the distance between third line component and fourth lens group.

EXAMPLE 1

| | $R_i$ | $D_i$ | $N_i$ | $\nu_i$ |
|---|---|---|---|---|
| 1 | ∞ | 1.50 | 1.80518 | 25.4 |
| 2 | 54.000 | 9.14 | 1.65160 | 58.7 |
| 3 | −392.892 | 0.10 | | |
| 4 | 83.290 | 4.50 | 1.72916 | 54.7 |
| 5 | 396.508 | 0.10 | | |
| 6 | 60.000 | 5.33 | 1.83400 | 37.2 |
| 7 | 250.634 | $l_1$ | | |
| 8 | 191.595 | 1.30 | 1.73400 | 51.5 |
| 9 | 18.330 | 6.18 | | |
| 10 | −29.920 | 1.17 | 1.72916 | 54.7 |
| 11 | 17.416 | 4.76 | 1.80518 | 25.4 |
| 12 | 138.000 | $l_2$ | | |
| 13 | −25.647 | 1.20 | 1.61800 | 63.4 |
| 14 | −792.000 | $l_3$ | | |
| 15 | −234.000 | 3.78 | 1.48749 | 70.1 |
| 16 | −25.702 | 0.10 | | |
| 17 | 55.710 | 4.02 | 1.61800 | 63.4 |
| 18 | −62.439 | 1.00 | | |
| 19 | ∞ | 8.00 | 1.55963 | 61.2 |
| 20 | 109.125 | 4.50 | | |
| 21 | 42.360 | 3.16 | 1.77250 | 49.7 |
| 22 | 2824.529 | 0.10 | | |
| 23 | 17.279 | 4.87 | 1.64000 | 60.1 |
| 24 | 147.160 | 2.06 | | |
| 25 | −189.000 | 1.20 | 1.84666 | 23.9 |
| 26 | 21.500 | 10.40 | | |
| 27 | 48.000 | 1.20 | 1.80518 | 25.4 |
| 28 | 13.703 | 4.13 | | |
| 29 | 21823.107 | 2.61 | 1.51633 | 64.1 |
| 30 | −33.000 | 0.10 | | |
| 31 | 21.776 | 4.41 | 1.60342 | 38.0 |
| 32 | −37.468 | 3.50 | | |
| 33 | ∞ | 5.5 | 1.51633 | 64.1 |
| 34 | ∞ | | | | f = 12.395~81.500
aperture ratio 1:1.6
$f_1 = 4.86 F_S$
$|f_2| = 1.18 F_S$
$l = 1.53 F_S$
$\overline{n}_2 = 1.73158$
$\nu_1 = 50.2$

| f | 12.377 | 40.000 | 81.500 |
|---|---|---|---|
| $l_1$ | 1.628 | 24.851 | 32.964 |
| $l_2$ | 34.510 | 7.869 | 3.431 |
| $l_3$ | 1.483 | 4.901 | 1.225 |

EXAMPLE 1

| | $R_i$ | $D_i$ | $N_i$ | $\nu_i$ |
|---|---|---|---|---|
| 1 | −282.196 | 1.50 | 1.84666 | 23.9 |
| 2 | 77.480 | 6.81 | | |
| 3 | 229.782 | 6.19 | 1.77250 | 49.7 |
| 4 | −107.048 | 0.15 | | |
| 5 | 55.341 | 8.32 | 1.77250 | 49.7 |
| 6 | −1225.000 | $l_1$ | | |
| 7 | 780.744 | 1.38 | 1.78800 | 47.4 |
| 8 | 18.346 | 5.29 | | |
| 9 | −50.752 | 1.38 | 1.72916 | 54.7 |
| 10 | 37.714 | 1.50 | | |
| 11 | 34.000 | 3.99 | 1.80518 | 25.4 |
| 12 | −263.618 | $l_2$ | | |
| 13 | −80.922 | 1.20 | 1.56873 | 63.2 |
| 14 | 119.140 | $l_3$ | | |
| 15 | ∞ | 8.00 | 1.55963 | 61.2 |
| 16 | ∞ | 3.00 | | |
| 17 | 234.000 | 3.70 | 1.77250 | 49.7 |
| 18 | 51.627 | 1.20 | | |
| 19 | 21.054 | 5.47 | 1.61800 | 63.4 |
| 20 | 91.900 | 0.15 | | |
| 21 | 28.799 | 4.87 | 1.48749 | 70.1 |
| 22 | 96.017 | 1.96 | | |
| 23 | −102.539 | 1.20 | 1.80518 | 25.4 |
| 24 | 60.691 | 10.26 | | |
| 25 | 66.762 | 1.18 | 1.84666 | 23.9 |
| 26 | 13.636 | 2.83 | | |
| 27 | 58.000 | 3.00 | 1.69680 | 55.5 |
| 28 | −52.200 | 0.10 | | |
| 29 | 14.449 | 5.02 | 1.48749 | 70.1 |
| 30 | 105.925 | 3.33 | | |
| 31 | ∞ | 5.50 | 1.51633 | 64.1 |
| 32 | ∞ | | | | f = 11.377~64.000
aperture ratio 1:1.7
$f_1 = 6.10 F_S$
$|f_2| = 1.90 F_S$
$l = 1.53 F_S$
$\overline{n}_2 = 1.75858$
$\nu_1 = 49.7$

| f | 11.377 | 30.000 | 64.000 |
|---|---|---|---|
| $l_1$ | 1.200 | 29.814 | 43.257 |
| $l_2$ | 44.630 | 9.264 | 2.596 |
| $l_3$ | 2.000 | 8.753 | 1.977 |

What is claimed is:

1. A zoom lens system comprising, in order from the object side, a first lens group having a positive focal length, a second lens group having a negative focal length, a third lens component having a negative focal length and a fourth lens group having a positive focal length, said second component third lens groups being moved along the optical axis to achieve variation in the overall focal length and correction for focus movement, said first lens group including a single negative lens and three positive lenses, said second lens group including, in order from the object side, a negative lens, a negative lens and a positive lens, said third lens component including a single negative lens, and said fourth lens group including an optical path separation prism and, in order from the object side, three positive lenses, two independent negative lenses and two positive lenses, said zoom lens system satisfying the following conditions:

$$4.6F_S < f_1 < 6.5F_S \quad (1)$$

$$F_S < |f_2| < 2F_S, f_2 < 0 \quad (2)$$

$$l > 1.4F_S \quad (3)$$

$$\bar{n}_2 > 1.70 \quad (4)$$

$$\bar{\nu}_1 > 45 \quad (5)$$

where
$F_S$ is the overall focal length at the minimum focal length,
$f_1$ is the resultant focal length of the first lens group,
$f_2$ is the resultant focal length of the second lens group,
$l$ is the distance between the apex of the final lens surface of the positive lens disposed on the object side, of the fourth lens group and the apex of the front lens surface of the positive lens disposed on the image side, of the fourth lens group,
$\bar{n}_2$ is the average refractive index of the negative lenses in the second lens group, and
$\bar{\nu}_1$ is the average Abbe number of the positive lenses in the first lens group.

2. A zoom lens system comprising, in order from the object side, a first lens group having a positive focal length, a second lens group having a negative focal length, a third lens component having a negative focal length and a fourth lens group having a positive focal length, said second lens group and said third lens component being moved along the optical axis to achieve variation in the overall focal length and correction for focus movement, said first lens group including a single negative lens and two positive lenses, said second lens group including, in order from the object side, a negative lens, a negative lens and a positive lens, said third lens component including a single negative lens, and said fourth lens group including an optical path separation prism and, in order from the object side, four positive lenses, two independent negative lenses and two positive lenses, said zoom lens system satisfying the following conditions:

$$4.6F_S < f_1 < 6.5F_S \quad (1)$$

$$F_S < |f_2| < 2F_S, f_2 < 0 \quad (2)$$

$$l > 1.4F_S \quad (3)$$

$$\bar{n}_2 > 1.70 \quad (4)$$

$$\bar{\nu}_1 > 45 \quad (5)$$

where
$F_S$ is the overall focal length at the minimum focal length,
$f_1$ is the resultant focal length of the first lens group,
$f_2$ is the resultant focal length of the second lens group,
$l$ is the distance between the apex of the final lens surface of the positive lens disposed on the object side, of the fourth lens group and the apex of the front lens surface of the positive lens disposed on the image side, of the fourth lens group,
$\bar{n}_2$ is the average refractive index of the negative lenses in the second lens group, and
$\bar{\nu}_1$ is the average Abbe number of the positive lenses in the first lens group.

3. A zoom lens system comprising, in order from the object side, a first lens group having a positive focal length, a second lens group having a negative focal length, a third lens component having a negative focal length and a fourth lens group having a positive focal length, said second lens group and said third lens component being moved along the optical axis to achieve variation in the overall focal length and correction for focus movement, said first lens group including a single negative lens and two positive lenses, said second lens group including, in order from the object side, a negative lens and a positive lens, said third lens component comprising a single negative lens, and said fourth lens group including an optical path separation prism and, in order from the object side, four positive lenses, two negative lenses and two positive lenses, said zoom lens system satisfying the following conditions:

| | $R_i$ | $D_i$ | $N_i$ | $\nu_i$ |
|---|---|---|---|---|
| 1 | ∞ | 1.50 | 1.80518 | 25.4 |
| 2 | 54.000 | 9.14 | 1.65160 | 58.7 |
| 3 | −392.892 | 0.10 | | |
| 4 | 83.290 | 4.50 | 1.72916 | 54.7 |
| 5 | 396.508 | 0.10 | | |
| 6 | 60.000 | 5.33 | 1.83400 | 37.2 |
| 7 | 250.634 | $l_1$ | | |
| 8 | 191.595 | 1.30 | 1.73400 | 51.5 |
| 9 | 18.330 | 6.18 | | |
| 10 | −29.920 | 1.17 | 1.72916 | 54.7 |
| 11 | 17.416 | 4.76 | 1.80518 | 25.4 |
| 12 | 138.000 | $l_2$ | | |
| 13 | −25.647 | 1.20 | 1.61800 | 63.4 |
| 14 | −792.000 | $l_3$ | | |
| 15 | −234.000 | 3.78 | 1.48749 | 70.1 |
| 16 | −25.702 | 0.10 | | |
| 17 | 55.710 | 4.02 | 1.61800 | 63.4 |
| 18 | −62.439 | 1.00 | | |
| 19 | ∞ | 8.00 | 1.55963 | 61.2 |
| 20 | 109.125 | 4.50 | | |
| 21 | 42.360 | 3.16 | 1.77250 | 49.7 |
| 22 | 2824.529 | 0.10 | | |
| 23 | 17.279 | 4.87 | 1.64000 | 60.1 |
| 24 | 147.160 | 2.06 | | |
| 25 | −189.000 | 1.20 | 1.84666 | 23.9 |
| 26 | 21.500 | 10.40 | | |
| 27 | 48.000 | 1.20 | 1.80518 | 25.4 |
| 28 | 13.703 | 4.13 | | |
| 29 | 21823.107 | 2.61 | 1.51633 | 64.1 |
| 30 | −33.000 | 0.10 | | |
| 31 | 21.776 | 4.41 | 1.60342 | 38.0 |
| 32 | −37.468 | 3.50 | | |
| 33 | ∞ | 5.5 | 1.51633 | 64.1 |
| 34 | ∞ | | | |

$f = 12.395 \sim 81.500$
aperture ratio 1:1.6
$f_1 = 4.86 F_S$
$|f_2| = 1.18 F_S$
$l = 1.53 F_S$
$\bar{n}_2 = 1.73158$
$\bar{\nu}_1 = 50.2$

| $f$ | 12.377 | 40.000 | 81.500 |
|---|---|---|---|
| $l_1$ | 1.628 | 24.851 | 32.964 |
| $l_2$ | 34.510 | 7.869 | 3.431 |
| $l_3$ | 1.483 | 4.901 | 1.225 | where:

$F_S$ is the overall focal length at the minimum focal length,
$f_1$ is the resultant focal length of said first lens group,
$f_2$ is the resultant focal length of said second lens group,
l is the distance between the apex of the final lens surface of the positive lens disposed on the object side, of said fourth lens group and the apex of the front lens surface of the positive lens disposed on the image side, of said fourth lens group,
$\overline{n}_2$ is the average refractive index of the negative lenses kin said second lens group,
$v_1$ is the average refractive index of the positive lenses in said first lens group,
$R_i$ is the radius of curvature of the i-th lens surface,
$D_i$ is the lens thickness or distance of the i-th lens,
$N_i$ is the refractive index of d-line of the i-th lens,
$v_i$ is the Abbe number of the i-th lens,
f is the focal length,
$l_1$ is the distance between first and second lens groups,
$l_2$ is the distance between the second lens group, and the third lens component, and
$l_3$ is the distance between the third lens component and fourth lens group.

4. A zoom lens system comprising, in order from the object side, a first lens group having a positive focal length, a second lens group having a negative focal length, a third lens component having a negative focal length and a fourth lens group having a positive focal length, said lens group and said third lens component being moved along the optical axis to achieve variation in the overall focal length and correction for focus movement, said first lens group including a single negative lens and a three positive lenses, said second lens group including, in order from object side, a negative lens, and a positive lens, said third lens component including a single negative lens, and said fourth lens group including an optical path separation prism and, in order from the object side, three positive lenses, two negative lenses and two positive lenses, said zoom lens system satisfying the following conditions:

|    | $R_i$     | $D_i$ | $N_i$   | $v_i$ |
|----|-----------|-------|---------|-------|
| 1  | −282.196  | 1.50  | 1.84666 | 23.9  |
| 2  | 77.480    | 6.81  |         |       |
| 3  | 229.782   | 6.19  | 1.77250 | 49.7  |
| 4  | −107.048  | 0.15  |         |       |
| 5  | 55.341    | 8.32  | 1.77250 | 49.7  |
| 6  | −1225.000 | $l_1$ |         |       |
| 7  | 780.744   | 1.38  | 1.78800 | 47.4  |
| 8  | 18.346    | 5.29  |         |       |
| 9  | −50.752   | 1.38  | 1.72916 | 54.7  |
| 10 | 37.714    | 1.50  |         |       |

-continued

|    | $R_i$    | $D_i$ | $N_i$   | $v_i$ |
|----|----------|-------|---------|-------|
| 11 | 34.000   | 3.99  | 1.80518 | 25.4  |
| 12 | −263.618 | $l_2$ |         |       |
| 13 | −80.922  | 1.20  | 1.56873 | 63.2  |
| 14 | 119.140  | $l_3$ |         |       |
| 15 | ∞        | 8.00  | 1.55963 | 61.2  |
| 16 | ∞        | 3.00  |         |       |
| 17 | 234.000  | 3.70  | 1.77250 | 49.7  |
| 18 | −51.627  | 1.20  |         |       |
| 19 | 21.054   | 5.47  | 1.61800 | 63.4  |
| 20 | 91.900   | 0.15  |         |       |
| 21 | 28.799   | 4.87  | 1.48749 | 70.1  |
| 22 | 96.017   | 1.96  |         |       |
| 23 | −102.539 | 1.20  | 1.80518 | 24.4  |
| 24 | 60.691   | 10.26 |         |       |
| 25 | 66.762   | 1.18  | 1.84666 | 23.9  |
| 26 | 13.636   | 2.83  |         |       |
| 27 | 58.000   | 3.00  | 1.69680 | 55.5  |
| 28 | −52.200  | 0.10  |         |       |
| 29 | 14.449   | 5.02  | 1.48749 | 70.1  |
| 30 | 105.925  | 3.33  |         |       |
| 31 | ∞        | 5.50  | 1.51633 | 64.1  |
| 32 | ∞        |       |         |       |

$$f = 11.377 \sim 64.000$$
aperture ratio 1:1.7
$$f_1 = 6.10 F_S$$
$$|f_2| = 1.90 F_S$$
$$l = 1.53 F_S$$
$$\overline{n}_2 = 1.75858$$
$$\overline{v}_1 = 49.7$$

|       |        |        |        |
|-------|--------|--------|--------|
| f     | 11.377 | 30.000 | 64.000 |
| $l_1$ | 1.200  | 29.814 | 43.257 |
| $l_2$ | 44.630 | 9.264  | 2.596  |
| $l_3$ | 2.000  | 8.753  | 1.977  |

$F_S$ is the overall focal length at the minimum focal length,
$f_1$ is the resultant focal length of said first lens group,
$f_2$ is the resultant focal length of said second lens group,
l is the distance between the apex of the final lens surface of the positive lens disposed on the object side, of said fourth lens group and the apex of the front lens surface of the positive lens disposed on the image side, of said fourth lens group,
$N_2$ is the average refractive index of the negative lenses in said second lens group,
$v_1$ is the average refractive index of the positive lenses in said first lens group,
$R_1$ is the radius of curvature of the i-th lens surface,
$D_i$ is the lens thickness or distance of the i-th lens,
$N_i$ is the refractive index at d-line of the i-th lens,
$v_i$ is the Abbe number of the i-th lens,
f is the focal length,
$l_1$ is the distance between first and second lens groups,
$l_2$ is the distance between the second lens group and the third lens component, and
$l_3$ is the distance between the third lens component and fourth lens group.

* * * * *